United States Patent
Bonnery et al.

(10) Patent No.: US 10,768,752 B2
(45) Date of Patent: Sep. 8, 2020

(54) METHOD FOR INTERACTING WITH AN ELECTRONIC AND/OR COMPUTER DEVICE IMPLEMENTING A CAPACITIVE CONTROL SURFACE AND A PERIPHERAL SURFACE, INTERFACE AND DEVICE IMPLEMENTING THIS METHOD

(71) Applicant: QUICKSTEP TECHNOLOGIES LLC, Wilmington, DE (US)

(72) Inventors: Clément Bonnery, Ferney-Voltaire (FR); Gilles Lebastard, Founex (CH)

(73) Assignee: QuickStep Technologies LLC, Wilmington, DE (US)

( * ) Notice: Subject to any disclaimer, the term of this patent is extended or adjusted under 35 U.S.C. 154(b) by 13 days.

(21) Appl. No.: 15/551,257

(22) PCT Filed: Feb. 25, 2016

(86) PCT No.: PCT/US2016/019628
§ 371 (c)(1),
(2) Date: Aug. 15, 2017

(87) PCT Pub. No.: WO2016/138302
PCT Pub. Date: Sep. 1, 2016

(65) Prior Publication Data
US 2018/0067580 A1    Mar. 8, 2018

(30) Foreign Application Priority Data
Feb. 27, 2015   (FR) ...................................... 15 51675

(51) Int. Cl.
*G06F 3/044* (2006.01)
*G06F 3/0488* (2013.01)
(Continued)

(52) U.S. Cl.
CPC .......... *G06F 3/044* (2013.01); *G06F 3/04883* (2013.01); *G06F 21/36* (2013.01); *G06F 21/316* (2013.01)

(58) Field of Classification Search
CPC ....... G06F 21/36; G06F 3/044; G06F 3/04883
See application file for complete search history.

(56) References Cited

U.S. PATENT DOCUMENTS

| | | |
|---|---|---|
| 5,483,261 A | 1/1996 | Yasutake |
| 5,488,204 A | 1/1996 | Mead et al. |

(Continued)

FOREIGN PATENT DOCUMENTS

| | | |
|---|---|---|
| CN | 101957707 A | 1/2011 |
| CN | 102754050 A | 10/2012 |

(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Chun-Nan Lin
(74) *Attorney, Agent, or Firm* — Kubota & Basol LLP

(57) ABSTRACT

The present invention relates to a method for interacting with an electronic and/or computer device comprising a control surface, at least one peripheral surface and a plurality of capacitive electrodes positioned at least along the control surface and arranged to detect control objects in a vicinity of said control surface and said at least one peripheral surface, which method comprising steps for (i) detecting (40, 41, 42, 43) a sequence of actions comprising a plurality of elementary actions performed at least partially sequentially, by at least one control object, at least partially in contact with or opposite said at least one peripheral surface and (ii) triggering (44), based on said sequence of actions, of at least one function in said device.

(Continued)

Figure 1:
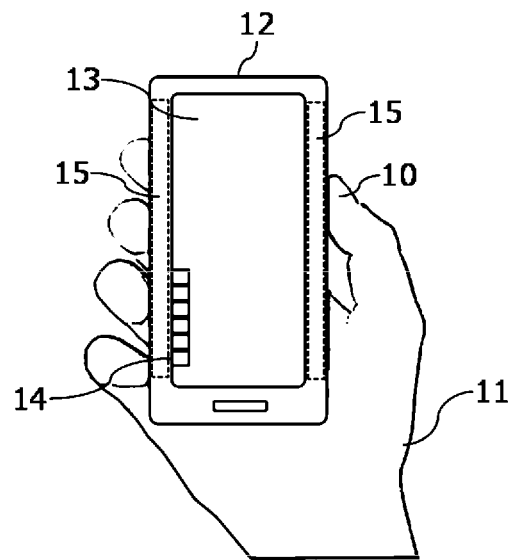

The invention also relates to an interface and device implementing this method.

25 Claims, 3 Drawing Sheets

(51) Int. Cl.
*G06F 21/36* (2013.01)
*G06F 21/31* (2013.01)

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,844,506 A | 12/1998 | Binstead | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 6,847,354 B2 | 1/2005 | Vranish | |
| 7,015,894 B2 | 3/2006 | Morohoshi | |
| 7,184,064 B2 | 2/2007 | Zimmerman et al. | |
| 7,570,064 B2 | 8/2009 | Roziere | |
| 7,663,607 B2 | 2/2010 | Hotelling et al. | |
| 8,149,002 B2 | 4/2012 | Ossart et al. | |
| 8,159,213 B2 | 4/2012 | Roziere | |
| 8,479,122 B2 | 7/2013 | Hotelling et al. | |
| 8,770,033 B2 | 7/2014 | Roziere | |
| 8,917,256 B2 | 12/2014 | Roziere | |
| 9,035,903 B2 | 5/2015 | Binstead | |
| 2006/0097733 A1 | 5/2006 | Roziere | |
| 2006/0197753 A1 | 9/2006 | Hotelling | |
| 2008/0284261 A1 | 11/2008 | Andrieux et al. | |
| 2010/0052700 A1 | 3/2010 | Yano et al. | |
| 2011/0087963 A1* | 4/2011 | Brisebois | G06F 3/03547 715/702 |
| 2011/0169783 A1 | 7/2011 | Wang et al. | |
| 2011/0209102 A1* | 8/2011 | Hinckley | G06F 3/0483 715/863 |
| 2011/0242040 A1 | 10/2011 | Nutaro et al. | |
| 2012/0044662 A1 | 2/2012 | Kim et al. | |
| 2012/0187965 A1 | 7/2012 | Roziere | |
| 2012/0188200 A1* | 7/2012 | Roziere | G06F 3/044 345/174 |
| 2013/0135247 A1 | 5/2013 | Na et al. | |
| 2013/0307776 A1 | 11/2013 | Roziere | |
| 2014/0132335 A1 | 5/2014 | Rauhala et al. | |
| 2014/0375577 A1 | 12/2014 | Yeh et al. | |
| 2015/0035792 A1* | 2/2015 | Roziere | G06F 3/0418 345/174 |
| 2015/0084743 A1* | 3/2015 | G | G07C 9/00158 340/5.83 |
| 2015/0091854 A1 | 4/2015 | Roziere et al. | |
| 2015/0123925 A1 | 5/2015 | Qin et al. | |
| 2017/0075489 A1* | 3/2017 | Jaaskela | G06F 3/0418 |

FOREIGN PATENT DOCUMENTS

| | | |
|---|---|---|
| CN | 103544426 A | 1/2014 |
| CN | 104133639 A | 11/2014 |
| CN | 104298410 A | 1/2015 |
| CN | 104317523 A | 1/2015 |
| CN | 104335150 A | 2/2015 |
| EP | 2 077 490 A2 | 7/2009 |
| EP | 2 267 791 A2 | 10/2010 |
| EP | 2 763 005 A1 | 8/2014 |
| JP | 2000-163031 A | 6/2000 |
| JP | 2002-342033 A | 11/2002 |
| WO | WO-2010/043277 A1 | 4/2010 |
| WO | WO-2013/048461 A1 | 4/2013 |
| WO | WO-2013/160323 A1 | 10/2013 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Office Action received for Chinese Patent Application No. 201680012064.0, dated Sep. 4, 2019, 19 pages (11 pages of English Translation and 8 pages of Official Copy).

Office Action received for European Patent Application No. 16709636.1, dated Sep. 6, 2019, 6 pages.

International Search Report dated May 23, 2016, for PCT Application No. PCT/US2016/019628, filed Feb. 25, 2016, 7 pages.

Notification Concerning Transmittal of International Preliminary Report on Patentability dated Sep. 8, 2017, for PCT Application No. PCT/US2016/019628, 8 pages.

\* cited by examiner

METHOD FOR INTERACTING WITH AN ELECTRONIC AND/OR COMPUTER DEVICE IMPLEMENTING A CAPACITIVE CONTROL SURFACE AND A PERIPHERAL SURFACE, INTERFACE AND DEVICE IMPLEMENTING THIS METHOD

CROSS-REFERENCE TO RELATED APPLICATIONS

This application is a National Phase application under 35 U.S.C. § 371 of International Application No. PCT/US2016/019628, filed Feb. 25, 2016, which claims the priority benefit of French Patent Application No. 1551675, filed Feb. 27, 2015, the contents of which are hereby incorporated by reference in their entirety for all intended purposes.

TECHNICAL FIELD

The present invention relates to a method for interacting with an electronic and/or computer device implementing a capacitive control surface and a peripheral surface. It also relates to a man-machine interface and a user device implementing this method.

The field of the invention is, but is not limited to, that of man-machine interfaces (MMI) to interact with a user device, implementing a capacitive detection technology. More particularly, the field of the invention is that of MMIs comprising a control surface using capacitive technology, to interact with a user device without contact with the control surface.

PRIOR ART

Most electronic communication devices or audiovisual devices are equipped with screens or control surfaces, commonly called tactile surfaces, making it possible to interact with these devices. In devices of the tablet or smartphone type in particular, the control surface is transparent. It is integrated in or on the display screen of these devices to increase the size of the display screen.

Most often, these control surfaces are based on capacitive measuring techniques.

Depending on the techniques used, they make it possible to detect control objects, such as fingers or a stylus, in contact with the control surface or sometimes at a distance from that surface.

Capacitive measuring techniques are known that are based on mutual capacitance measurements. In these techniques, mutual coupling capacitances are measured between transmitting electrodes and receiving electrodes. When a control object is brought near an interaction zone between the transmitting and receiving electrodes, it disrupts the field lines and modifies the measured mutual capacitance. This type of method is essentially limited to measurements by contact due to its limited sensitivity. The transmitting and receiving electrodes are often positioned in rows and columns with overlapping zones.

Capacitive measuring techniques are also known based on individual capacitance measurements (generally called "self" mode). In these techniques, the capacitance is measured between each electrode and one or more control objects located nearby. These methods make it possible to detect objects at a distance from the electrodes, therefore without contact. The electrodes can for example be arranged in rows or columns, or in a matrix arrangement. However, when the structure in rows and columns is used, the presence of several objects simultaneously creates "ghosts" that lead to false detections. In this case, the method is therefore essentially limited to detecting one object at a time.

Document WO 2011/015794 is known, for example, which describes a control interface method and device based on a "self"-type measuring technique with electrodes in matrix form that makes it possible to detect objects in contact with and at a distance from electrodes with a high sensitivity owing to the use of a guard and electronics referenced at the potential of that guard.

Smartphone type small portable terminals (for example) have particular usage and ergonomic constraints. During their design, an effort is generally made to maximize the size of the control surface with the display relative to the size of the face of the device on which it is located, in particular by having it extend almost to the edges, and near the rims, of the device.

In this case, when the device is held in the hand, the fingers that are placed on the rims or edges extend into the immediate vicinity of the control surface.

Devices provided with such a capacitive control surface generally comprise, on their rim, or more generally on the periphery of the control surface, additional selection means for selecting certain functions such as the adjustment of the volume or brightness, or turning off the display screen, etc. The selection means can for example comprise electromechanical buttons, or sometimes additional capacitive sensors.

However, these elements increase the complexity and manufacturing cost of the device.

With certain capacitive measuring techniques implemented for the control surface, in particular in "self" mode, the measuring electrodes on the periphery of the control surface have a sensitivity that makes it possible to detect fingers present on the edge of the device nearby. This phenomenon is referred to as "edge effects".

Known for example is document WO 2013/160323, which describes a method for interacting with a device that uses this sensitivity to edge effects of the measuring electrodes on the periphery of the control surface. This document in particular describes controls that can be effected from actions in a peripheral zone around the control surface, in particular with the fingers holding the device.

This method has the advantage of making it possible to eliminate electromechanical control buttons.

It also has the advantage of making it possible to perform commands with actions that are not executed in a precise position on the device (in contrast with actions on a physical button), which makes it possible to adapt to the morphology of the user's hand. Indeed, inasmuch as the entire peripheral zone is sensitive, an action (for example, a "tap"), can be detected and used in any position on this peripheral zone.

The use of the peripheral zones around the control surface also opens up new possibilities for controls or interactions.

It also poses problems of robustness and reliability in interpreting controls, with an increased risk of incorrect interpretation of stray gestures.

The present invention aims to propose new methods for interacting with the peripheral zones.

The present invention also aims to propose such interaction methods that have an increased reliability and robustness.

DESCRIPTION OF THE INVENTION

This aim is achieved with a method for interacting with an electronic and/or computer device comprising:

a control surface;

at least one surface, called peripheral, arranged on the periphery of said control surface;

a plurality of capacitive electrodes arranged at least along the control surface and arranged to detect control objects in the vicinity of said control surface and said at least one peripheral surface;

this method being characterized in that it comprises the following steps:

detecting a sequence of actions comprising a plurality of elementary actions performed at least partially sequentially, by at least one control object, at least partially in contact with or across from said at least one peripheral surface;

triggering at least one function in said device based on said sequence of actions.

Thus, according to the inventive method, a function or control of the device is triggered by a sequence of actions, i.e., a temporal sequence of elementary actions performed, for at least some of them, in the peripheral zones across from the peripheral surfaces.

The "elementary actions" can include any type of actions performed by one or more control objects, such as a finger.

These elementary actions can in particular comprise actions generally known and used to interact with a control surface. They can in particular comprise actions known under the names: tap, double tap, long press, swipe, flick, move, slide, scroll, as well as actions done remotely, by hovering, etc.

It should be noted that the double tap may be considered in the context of the invention to be a single elementary action because it involves a single action defined in this form.

The elementary actions can also comprise actions taking into account a detection or measurement of bearing pressure exerted by one or more control objects on a surface of the device. These elementary actions can in particular comprise taps or long presses done with a bearing force, or by applying a variable pressure over time.

These measurements or bearing pressure detections can be done using any means, in particular including:

a deformation measurement of the control object(s) on a surface, from an analysis of the measurements obtained with the capacitive electrodes;

a movement or deformation measurement of the bearing surface, from measurements obtained with the capacitive electrodes and optionally additional sensors (deformation of a dielectric layer that influences the capacitive measurement, measurement of the overall movement of the bearing surface, etc.).

The peripheral surface(s) can for example extend over the face of the device that bears the control surface. They can also extend over the adjacent faces that make up the sides of the device (i.e., the faces that have an orientation substantially 90° from the face of the control surface).

Thus, the method according to the invention makes it possible to perform commands complex enough to limit the risks of triggering accidental commands.

It thus allows a robust implementation of commands that can be triggered in different positions (or independently of the position) in the peripheral zones so as to adapt the user's morphology or how the user has grasped the device (right hand, left hand, small or large hand, etc.).

The function or command can use input parameters from elementary actions (or at least the last elementary action) of the sequence that triggered it.

The triggering of a function may include stopping another function, potentially triggered beforehand by a sequence of identical or different actions.

It also makes it possible to implement encoding, i.e., sequences complex enough to be difficult for an unauthorized user to reproduce. Such encoding can for example be used by replacing the entry on the control interface with a PIN code, or drawing a pattern on the control interface to unlock the device. They further have the advantage of allowing rapid execution with the hand holding the device.

According to embodiments, the method according to the invention may comprise a step for detecting a control object in contact with or across from a peripheral surface by using the edge effect of at least one capacitive electrode of said control surface located near said peripheral surface.

According to embodiments, the method according to the invention can also comprise a step for detecting a control object in contact with or across from a peripheral surface using capacitive electrodes present on that peripheral surface.

According to embodiments, the method according to the invention may comprise a step for detecting an elementary action corresponding to at least one of the following actions:

contact of a control object with a peripheral surface;

contact during a length of time shorter than the predetermined duration of a control object with a peripheral surface (for example, a tap);

contact during a length of time exceeding a predetermined length of time of a control object with a peripheral surface (for example, long press);

movement of the control object over a peripheral surface (for example, a slide or scroll);

movement of the control object over a peripheral surface within a predetermined distance interval.

According to embodiments, the method according to the invention may comprise a step for detecting an elementary action performed in contact with or across from the control surface.

Thus, the sequence of actions can also comprise actions performed on or across from the control surface.

The method according to the invention may in particular comprise a step for detecting an elementary action corresponding to at least one of the following actions:

contact of a control object with the control surface (for example, a tap, a long press, etc.);

movement of the control object over the control surface (for example, a swipe or scroll, etc.);

hovering of the control object opposite the control surface (for example, following a predetermined trajectory or gesture).

According to specific embodiments, the method according to the invention may comprise a step for detecting a sequence of actions comprising a first elementary action and a second elementary action performed at the same time.

These simultaneous elementary actions can for example be done using two fingers on two opposite faces of the device (for example, the thumb and the index finger).

According to embodiments, the method according to the invention may comprise a step for detecting a sequence of actions satisfying at least one of the following conditions:

sequence comprising a first elementary action and a second elementary action done sequentially;

sequence comprising a first elementary action and a second elementary action done sequentially in a time interval shorter than a predetermined duration;

sequence comprising a first elementary action and a second elementary action done sequentially and separated by a time interval shorter than a predetermined duration;

sequence comprising a first elementary action and a second elementary action done sequentially and separated by a time interval greater than a predetermined duration.

More generally, the detection of the action sequence may comprise taking into account a time parameter connecting two consecutive elementary actions.

The sequential and simultaneous natures may of course be combined. For example, an action sequence may comprise a sustained long press (corresponding to a static position), then tap or slide while this long press is maintained.

According to embodiments, the method according to the invention may comprise a step for detecting a sequence of actions comprising a first elementary action performed in a first zone of the peripheral surface and a second elementary action performed in a second zone of the peripheral surface.

These first and second zones of the peripheral surface can be defined in any way. They can for example comprise:

at least one fixed zone precisely located on the peripheral surface (similar in its expanse for example to a physical switch);

at least one extended fixed zone, corresponding to part or all of a side of the device (for example, left or right relative to the orientation of the display);

a second zone whose position is defined relative to the position of the first zone (for example above, below, on an opposite side of the device relative to the orientation of the display).

According to embodiments, the method according to the invention may comprise a step for detecting a sequence of actions comprising:

at least two elementary actions performed sequentially;
at least three elementary actions performed sequentially;
at least four elementary actions performed sequentially;
a sufficient number of elementary actions to allow unambiguous detection of that sequence of actions.

In general, an action sequence according to the invention can be defined by a set of parameters that may comprise elements from among:

elementary actions,
a series of elementary actions,
time parameters (duration, frequency, time interval) relative to these elementary actions and/or their succession;
localization parameters of the elementary actions in the peripheral zones and optionally on the control surface.

According to embodiments, the method according to the invention can comprise a step for triggering a function corresponding to unlocking of the device.

The sequence of actions can, for example, have an average complexity to contribute security against accidental unlocking.

It may also have a greater complexity to act as an entry code, for example to prevent activation of the device by unauthorized persons.

According to embodiments, the method according to the invention can comprise a step for triggering a function involving an interaction between at least one control object and a peripheral surface of the device.

This interaction can comprise an elementary action, and in particular an elementary action from among those previously described.

In this case, the sequence of actions according to the invention may result in activating or selecting a particular feature that uses, as input parameter, an interaction between at least one control object and a peripheral surface.

For example, the feature can be an adjustment of the audio volume, and the sequence of actions can be used to activate a slide to adjust this volume. Thus, by default, the slide is deactivated and cannot be actuated accidentally if the sequence of actions is not performed.

According to modes of implementation, the method according to the invention may further comprise steps consisting of:

defining an action sequence; and
assigning said saved action sequence to a predetermined function.

Thus, the action sequence that triggers a function can be defined by the user. This definition can be done in different ways. It may for example comprise:

a recording step during which the user executes the sequence;

a publishing step during which the user defines the sequence of elementary actions using appropriate publishing tools.

It may also comprise a validation step during which the user repeats the customized action sequence previously saved to validate it.

The definition of such a customized action sequence can for example be used to create a secret code, or to create custom shortcuts to trigger particular features.

According to another aspect, an interface device is proposed for interacting with an electronic and/or computer device comprising:

a control surface;
at least one surface, called peripheral, arranged on the periphery of said control surface;
a plurality of capacitive electrodes positioned at least along the control surface and arranged to detect control objects in the vicinity of said control surface and said at least one peripheral surface;

this interface control device comprising electronic and computing means arranged to:

detect a sequence of actions comprising a plurality of elementary actions performed at least partially sequentially, by at least one control object, at least partially in contact with or across from said at least one peripheral surface;

triggering, based on said sequence of actions, at least one feature in said device.

According to embodiments, the device according to the invention may comprise at least one peripheral surface with no capacitive electrodes.

According to other embodiments, the device according to the invention may comprise at least one peripheral surface provided with capacitive electrodes separate from the capacitive electrodes of the control surface.

According to embodiments, the device according to the invention may further comprise an electrode guard layer polarized at a so-called guard potential substantially or exactly equal to an excitation potential of said capacitive electrodes.

According to embodiments, the device according to the invention may comprise capacitive electrodes arranged in a matrix structure, each capacitive electrode taking a capacitive measurement between said capacitive electrode and the control object(s).

According to another aspect, an electronic and/or computer device is proposed comprising a man-machine interface according to the invention.

This device may further comprise a display screen, the control surface being transparent and positioned over said display screen.

This device may be a device of the smartphone, tablet, smart watch, wearable type, or any other type of portable device.

This device may also be a control module integrated into an installation or vehicle, or a computer control peripheral (touchpad, trackpad, control or command interface), etc.

DESCRIPTION OF FIGURES AND EMBODIMENTS

Figure 2:
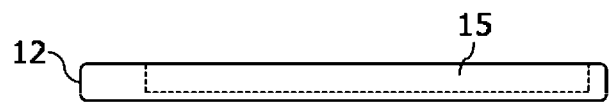
Figure 3:
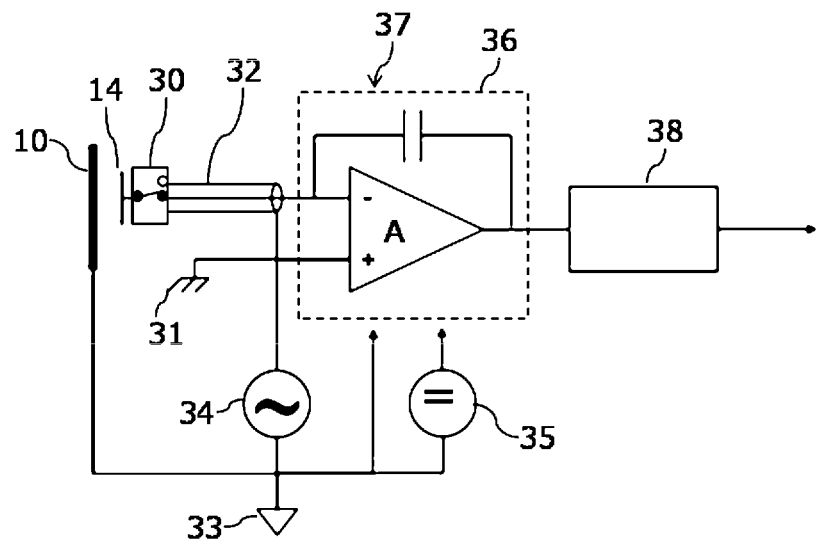
Figure 4:
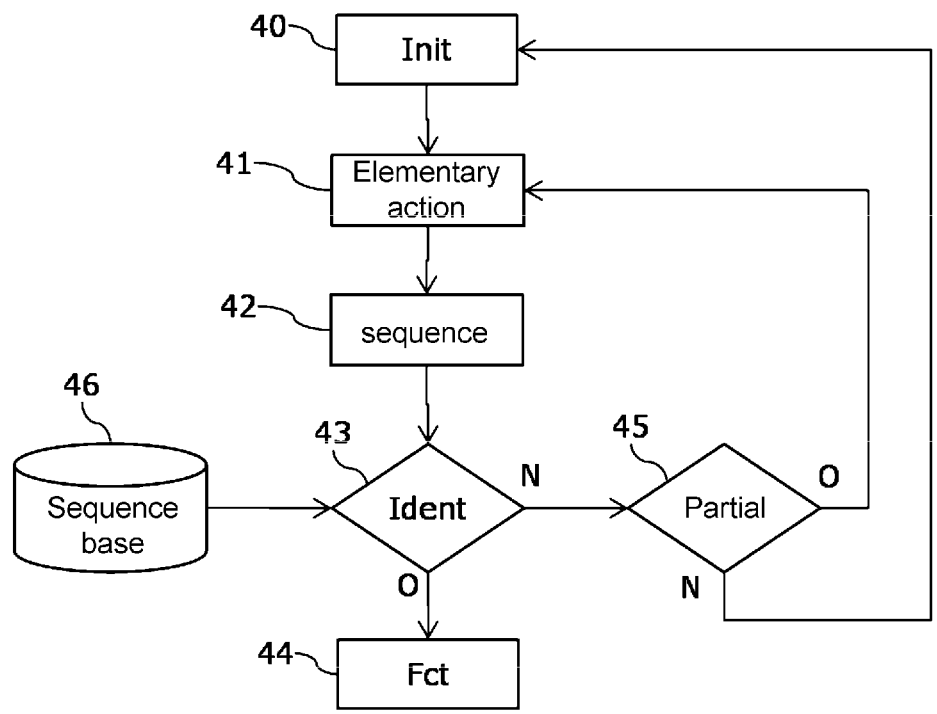
Figure 5:
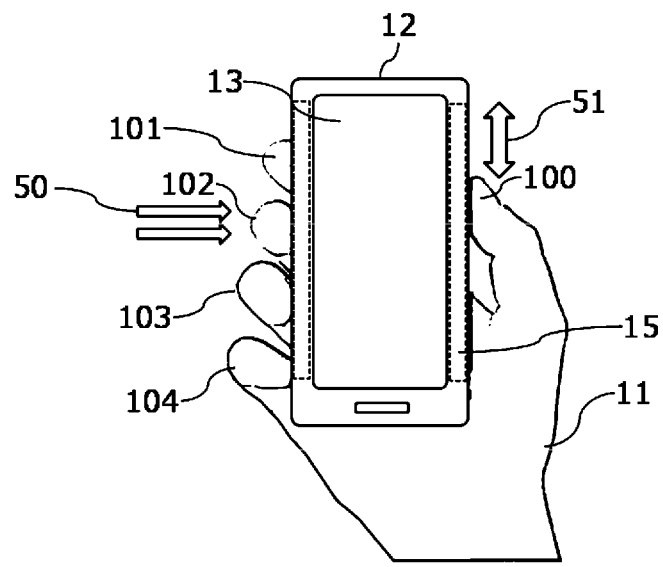
Figure 6:
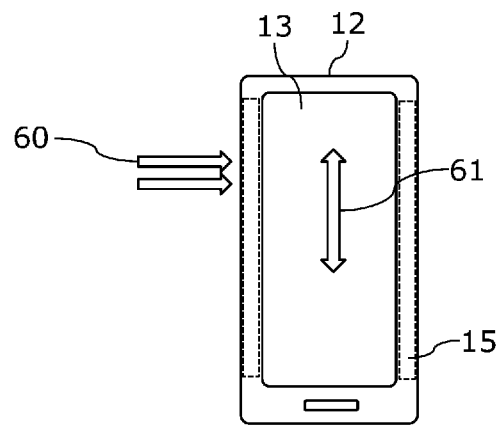
Figure 7:
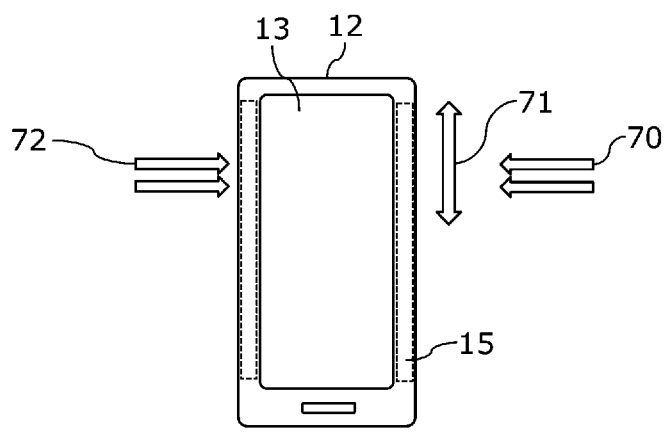

Other advantages and specificities of the invention will appear upon reading the detailed description of non-limiting implementations and embodiments, and the following appended drawings:

FIG. 1 illustrates a smartphone type electronic device according to the invention with a display screen provided with a tactile interface, as held in a hand, FIG. 2 shows a side view of a smartphone type electronic device according to the invention, FIG. 3 illustrates an embodiment of detection electronics for a control interface according to the invention, FIG. 4 shows a general block diagram of the method according to the invention, FIG. 5 shows an example embodiment of the invention to perform an unlocking function of a device, FIG. 6 shows an example embodiment of the invention to perform a wake-up function, FIG. 7 shows example embodiments of the invention to perform control or scrolling functions.

It is understood that the embodiments or implementations described below are in no way limiting. It is in particular possible to consider alternatives of the invention only comprising a selection of the features described below isolated from the other described features, if this selection of features is sufficient to impart a technical advantage or to differentiate the invention from the state of prior art. This selection comprises at least one, preferably functional feature without structural details, or with only some of the structural details if this part alone is sufficient to impart a technical advantage or to differentiate the invention from the state of prior art.

In particular, all of the alternatives and embodiments described can be combined with one another if nothing precludes that combination on a technical level.

In the figures, elements shared by several figures retain the same reference.

In reference to FIG. 1 and FIG. 2, we will describe an electronic device 12 according to the invention, designed to be able to be held in the hand.

In the described embodiment, this device is of the mobile telephone or smartphone type. It is understood, however, that its features are in no way limiting. The described embodiments could also be implemented on a tablet type computer or any electronic device with a similar form.

The device 12 comprises a control surface 13 with transparent capacitive measuring electrodes 14 superimposed on or integrated in a display screen.

The display screen can for example be of the LCD (liquid crystal display) type, the OLED (organic light-emitting diode) type, and/or based on a technology using quantum dots.

The transparent capacitive measuring electrodes 14 are positioned on the control surface 13 in a matrix arrangement.

These capacitive measuring electrodes 14 are arranged so as to be able to detect control objects 10, for example fingers 10, near or in contact with the control surface 13.

They are made from a substantially transparent conductive material, such as for example ITO (indium tin oxide), deposited on a dielectric material (glass or polymer).

The display screen with the control surface 13 and the measuring electrodes 14 make up a control interface that makes it possible to interact with the device 12.

According to an advantageous aspect of the invention, the control interface of the device 12 also comprises peripheral detection zones 15 on the edge of the control surface 13 that are arranged so as to allow more varied interactions with the user.

These peripheral detection zones 15 are positioned so as to be accessible to control objects 10 corresponding to fingers of the hand(s) 11 holding the device 12.

In the embodiment shown in FIG. 1 and FIG. 2, the device comprises two peripheral detection zones 15 located on the edge of the control surface 13.

These peripheral detection zones 15 are situated on either side of the control surface 13, outside the display zone, along the large lengths of the device 12. They extend over the face of the device that supports the control surface 13, in the zone typically referred to as the bezel. They also extend over the adjacent faces that make up the sides of the device (i.e., the faces that have an orientation of substantially 90° from the face of the control surface 13).

In the described embodiment, capacitive measuring electrodes of the periphery of the control surface 13 are used to detect control objects 10 in peripheral detection zones 15.

Indeed, these capacitive electrodes are sensitive to the presence of control objects 10 beyond the boundaries of the control surface 13. By comparing their measurements with those obtained with electrodes located more toward the inside of the control surface 13, it is possible to determine that a detected control object 10 is located in a peripheral detection zone 15 and not above the control surface 13, and to locate this control object 10 in the peripheral detection zone 15. This detection mode is called edge effect detection.

In the described embodiment, the device according to the invention has no capacitive measuring electrodes in the peripheral detection zones 15.

In reference to FIG. 3, we will now describe an example embodiment of detection electronics that makes it possible to produce a control interface according to the invention.

In this embodiment, the capacitive electrodes 14 make it possible to detect the presence and/or measure the distance of at least one control object 10 in their vicinity.

In particular, these measuring electrodes 14 and their associated electronics are arranged so as to allow the simultaneous detection of several control objects 10 in different configurations, in particular including:

control objects 10 in contact with and/or at a distance from the control surface 13; and/or control objects 10 in contact with and/or across from the peripheral surfaces 15.

The position of the control object(s) 10 is determined from the position of the measuring electrodes 14 that detect these control objects 10.

The distance, or at least information representative of this distance, between the control objects 10 and the electrodes 14 is determined for measurements of the capacitive coupling between these electrodes 14 and the control objects 10.

This embodiment makes it possible to obtain a sufficient measuring sensitivity to be able to detect and locate control objects 10 in contact with the control surface 13, or moving near that control surface 13.

Guard elements in the form of guard electrodes or guard planes (not shown) are positioned along the rear face of the measuring electrodes 14, relative to the detection zones of the control objects 10. These guard elements serve to prevent stray electric couplings between the measuring electrodes 14 and their environment, as will be explained later.

These guard elements are also made from a substantially transparent conductive material, for example ITO (indium tin oxide). They are separated from the measuring electrodes 14 by a layer of dielectric material.

The measuring electrodes 14 are connected to capacitive electronic measuring means 37.

These capacitive electronic measuring means 37 are made in the form of a capacitive measuring system with a floating bridge, as for example described in document WO 2011/015794.

The detection circuit comprises a so-called floating part 36, the reference potential 31 of which, called guard potential 31, oscillates relative to the ground 33 of the overall system, or the earth. The alternative difference in potential between the guard potential 31 and the ground 33 is generated by an excitation source or an oscillator 34.

The guard elements are connected to the guard potential 31.

The floating part 36 comprises the sensitive part of the capacitive detection, shown in FIG. 3 by a charge amplifier. It may of course comprise other means for processing and conditioning the signal, including digital or microprocessor-based, also referenced at the guard potential 31. These processing and conditioning means for example make it possible to calculate distance and pressure information from capacitive measurements.

The power supply of the floating part 36 is provided by floating power transfer means 35, for example comprising DC/DC converters.

This capacitive measuring system makes it possible to measure capacitance information between at least one measuring electrode 14 and a control object 10.

The control object 10 must be connected to a potential different from the guard potential 31, such as for example the ground potential 33. One is indeed in this configuration when the control object 10 is a finger of a user whose body defines a ground, or an object (such as a stylus) manipulated by that user.

A set of analog switches 30, controlled by electronic control means, makes it possible to select a measuring electrode 14 and connect it to the capacitive detection electronics 37 to measure the coupling capacitance thereof with the control object 10. The switches 30 are configured such that a measuring electrode 14 is connected either to the capacitive detection electronics 37 or to the guard potential 31.

The detection-sensitive part is protected by a guard shield 32 connected to the guard potential 31.

Thus, the measuring electrode 14 connected by a switch 30 to the capacitive detection electronics 37 (or active measuring electrode 14) is surrounded by guard planes made up at least in part of inactive measuring electrodes 14 and guard elements connected to the guard potential 31.

Since the active measuring electrode 14 is also at the guard potential 31, one thus avoids the appearance of stray capacitances between this electrode and the environment, such that only the coupling with the object of interest is measured with a maximum sensitivity.

The floating electronics 36 are connected at their output to the electronics of the device 38 referenced at the ground by electrical connections compatible with the different reference potentials. These connections can for example comprise differential amplifiers or optocouplers.

Of course, different embodiments of detection electronics can be implemented in the context of the invention.

It is in particular possible to implement electronic detections of the "self" type with an active guard to guarantee sufficient sensitivity to the electrodes 14. In this type of techniques, the electronics are referenced at the general ground, but the guard is polarized at the same potential as the electrodes 14.

In reference to FIG. 4, we will now describe an implementation of the method according to the invention.

The method is implemented in a micro-controller or a microprocessor of the device 12 that is at least partially dedicated to the operation of the man-machine interface.

It implements a database 46 of sequences of predetermined actions assigned to particular functions. This database is for example stored in a non-volatile memory.

The database 46 comprises sequences of actions defined at the operating system (for example Android, iOS or Windows) and/or in the applications.

It can also comprise sequences of actions defined or saved by the user.

As a non-limiting example, the sequences of actions are defined in the form of lists or tables of elementary sequence data. These elementary sequence data comprise a set of descriptive fields or attributes, such as:

a type of elementary action: tap, double tap, long press, swipe, flick, move, slide, scroll, as well as actions done remotely, by hovering, etc.;

a duration (depending on the type of elementary action);

a time interval or range of time intervals separating it from the preceding elementary action in the sequence;

localization parameters in the peripheral zones 15 or on the control surface 13;

a pointer or link toward a function.

In order to identify a sequence of actions, the method according to the invention comprises a first initialization step 40 in which a new empty candidate sequence is created.

It next comprises a step 41 for identifying an elementary action.

It then comprises a step 42 for building a sequence of actions during which the elementary action with its position, time, etc. attributes is added to the candidate sequence being built.

The candidate sequence is next compared during a comparison step 43 with the sequences recorded in the database 46.

If the candidate sequence corresponds to a complete recorded sequence, the method goes on to a step 44 for executing the associated function.

If the candidate sequence does not correspond to a complete recorded sequence, the method goes on to an analysis step 45:

if the candidate sequence corresponds to an incomplete recorded sequence, the method according to the invention returns to the identification step 41 of the following elementary action;

if the candidate sequence does not correspond to an incomplete recorded sequence, the method according to the invention returns to the initialization step 40. The candidate sequence in progress is rejected and a new empty candidate sequence is created.

A "timeout" expiration time is also introduced into the method to reset the candidate sequence when there are no new elementary actions during a predetermined time.

Of course, the elementary actions are also analyzed individually to trigger the functions with which they would be associated individually, if applicable.

In reference to FIG. 5, we will now describe an example implementation of a sequence of actions according to the invention, to carry out a secured unlocking code on a device of smartphone type.

The implemented sequence is the following:
1) holding in the hand with positioning of five control objects 10 in the form of five fingers of a hand 100, 101, 102, 103, 104, corresponding to five long presses;
2) while maintaining the long press with four fingers 100, 101, 103, 104, performing a double tap 50 with the middle finger 102;
3) then performing a slide 51 with the thumb 100.

If this sequence is identified, the unlocking function of the device is executed.

Of course, the sequence to be executed may be more or less complex as desired by the user. It can be stored by the latter, so as to be customized and kept secret.

This unlocking mode has a certain number of advantages. It can be executed with one hand, it is easy to implement, and it can have a high level of security.

It is even possible to account for the morphology of the user's hand, for increased security. Thus, in the described example, the relative position of the fingers, which depends on the morphology of the hand, is taken into account to validate long presses in step 1). Conversely, it is preferable not to take the absolute position of the fingers along the peripheral surfaces into account so that the user can execute the code even without looking at the device and without having to target specific positions.

In reference to FIG. 6, we will now describe an example implementation of a sequence of actions according to the invention, to perform a wake-up function on a device of the smartphone type.

The purpose of this example is to implement a wake-up function that does not risk being triggered accidentally on a device 12 with no physical buttons, since they are replaced by the sensitive peripheral zones 15.

For example, the following sequence is implemented:
1) double tap 60 on a peripheral surface, for example with the index finger 101;
2) movement 61 on the control surface 13, for example with the thumb.

This sequence triggers a wake-up function of the device 12.

The movement 61 may or may not comprise a specific path.

Thus, in standby mode, it is possible to keep only the capacitive sensors 14 on the periphery of the sensitive surface 13 active so as to limit power consumption. The double tap 60 triggers the activation of the sensors of the sensitive surface 13, which can thus detect the movement 61 if applicable.

In reference to FIG. 7, we will now describe implementation examples of sequences of actions that make it possible to perform adjustment or movement functions robustly and safely in terms of the risk of false triggering, by using the peripheral zones 15.

The purpose of these sequences of actions is to activate and use a virtual button of the slide type in a peripheral zone 15.

According to a first example, a sequence according to the invention is implemented to adjust an audio reproduction volume. To that end, a sequence is implemented comprising:

1) a double tap 70 in any position along a peripheral surface 15;
2) a movement 71 along the peripheral surface 15 starting from the same position.

This sequence triggers a function adjusting the sound of the device, which uses the movement 71 as input parameter.

In this case, one advantage of the invention is that it is possible to activate the adjustment function with a virtual button found in any position (for example, that which naturally falls under the thumb 100) along the peripheral surface 15, but while avoiding false triggering because a movement 71 alone would not activate the function.

According to another example, sequences are implemented according to the invention to create virtual scrollers with the possibility of implementing different modes. This mode of implementation can for example be used in a photo management application (gallery).

In this case, a first sequence is implemented comprising:
1) a double tap 70 in any position along a peripheral surface 15;
2) a movement 71 along the peripheral surface 15 starting from the same position.

This sequence triggers an image scrolling function on the screen of the device based on the amplitude or travel of the movement 71.

A second sequence is also implemented comprising:
1) a double tap 72 in any position along a peripheral surface 15;
2) a movement 71 along the peripheral surface 15 corresponding to the opposite face of the device 12.

This sequence triggers an image folder scrolling function on the screen of the device based on the amplitude or travel of the movement 71.

Thus, a double scrolling function is very simply implemented, or scrolling with two hierarchical levels.

In this case, the invention provides a dual advantage:
it is possible to activate the adjustment function with a virtual button found in any position (for example, that which naturally falls under the thumb) along a peripheral surface while avoiding false triggering because a movement 71 alone would not activate the function.;
a same movement 71 can very easily and intuitively be assigned to two different functions: an element-by-element or folder-by-folder movement.

Of course, the invention is not limited to the examples described above, and many alterations can be made to these examples without going beyond the scope of the invention.

The invention claimed is:

1. A method for interacting with an electronic computer device a control surface, at least one peripheral surface arranged on a periphery of the control surface, and a plurality of capacitive electrodes positioned at least along the control surface and arranged to detect one or more control objects in a vicinity of the control surface and the at least one peripheral surface, the method comprising:
   detecting a sequence of inputs by the one or more control objects in contact with or proximate to the at least one peripheral surface, wherein the sequence of inputs includes a movement of a first control object of the one or more control objects; and
   in response to detecting the movement of the first control object:
      in accordance with a determination that a first predetermined gesture was received and completed before the movement of the first control object, triggering at least one function in the electronic computer device based on the movement of the first control object; and in accordance with a determination that the first predetermined gesture was not completed before the movement of the first control object, forgoing triggering the at least one function in the electronic computer device.

2. The method according to claim 1, further comprising detecting the one or more control objects in contact with or across from the at least one peripheral surface using an edge effect of at least one capacitive electrode of the control surface located near the at least one peripheral surface.

3. The method according to claim 1, wherein the predetermined gesture is received at a first zone of the peripheral surface and the movement of the first control object is received at a second zone of the peripheral surface, different from the first zone.

4. The method according to claim 1, wherein the at least one function includes unlocking the electronic computer device.

5. The method according to claim 1, wherein the at least one function includes adjusting the audio volume of the electronic computer device in accordance with the movement of the first control object.

6. The method according to claim 1, wherein the first predetermined gesture includes a double tap gesture.

7. The method according to claim 1, wherein the first predetermined gesture includes a contact of five fingers on the at least one peripheral surface.

8. The method according to claim 1, wherein the movement of the first control object is received at a location where the first predetermined gesture was received.

9. The method according to claim 1, further comprising:
in response to detecting the first predetermined gesture, activating a plurality of the plurality of capacitive electrodes, wherein the plurality of the plurality of capacitive electrodes were not activated at the time the first predetermined gesture was received.

10. The method of claim 1, wherein the first predetermined gesture comprises at least one tap by at least one of the one or more control objects.

11. The method of claim 10, wherein the at least one tap comprises an end of contact of the at least one control object within a predetermined duration from initiating contact with the peripheral surface.

12. An interface device for interacting with an electronic computer device comprising:
a control surface;
at least one peripheral surface arranged on a periphery of the control surface; and
a plurality of capacitive electrodes positioned at least along the control surface and arranged to detect one or more control objects in a vicinity of the control surface and the at least one peripheral surface; and
a processor configured to:
detect a sequence of inputs by the one or more control objects in contact with or proximate to the at least one peripheral surface, wherein the sequence of inputs includes a movement of a first control object of the one or more control objects; and in response to detecting the movement of the first control object:
in accordance with a determination that a first predetermined gesture was received and completed before the movement of the first control object, trigger at least one function in the electronic computer device based on the movement of the first control object; and
in accordance with a determination that the first predetermined gesture was not completed before the movement of the first control object, forgo triggering the at least one function in the electronic computer device.

13. The interface device according to claim 12, wherein the at least one peripheral surface includes no capacitive electrodes.

14. The interface device according to claim 12, further comprising an electrode guard layer polarized at a guard potential substantially or exactly equal to an excitation potential of the capacitive electrodes.

15. The interface device according to claim 12, wherein:
a plurality of the plurality of capacitive electrodes are arranged in a matrix structure, and
each capacitive electrode of the plurality of capacitive electrodes are capable of measuring a capacitance between the respective capacitive electrode and the one or more control objects.

16. An electronic computer device comprising the interface device according to claim 12.

17. The electronic computer device according to claim 16, further comprising a display screen, the control surface being transparent and positioned over the display screen.

18. The interface device according to claim 12, wherein the first predetermined gesture includes a double tap gesture.

19. The interface device according to claim 12, wherein the first predetermined gesture includes a contact of five fingers on the at least one peripheral surface.

20. The interface device according to claim 12, wherein the movement of the first control object is received at a location where the first predetermined gesture was received.

21. The interface device according to claim 12, wherein the processor is further configured to:
in response to detecting the first predetermined gesture, activate a plurality of the plurality of capacitive electrodes, wherein the plurality of the plurality of capacitive electrodes were not activated at the time the first predetermined gesture was received.

22. The interface device according to claim 12, wherein the at least one function includes unlocking the electronic computer device.

23. The interface device according to claim 12, wherein the at least one function includes adjusting the audio volume of the electronic computer device in accordance with the movement of the first control object.

24. The interface device of claim 12, wherein the first predetermined gesture comprises at least one tap by at least one of the one or more control objects.

25. The interface device of claim 24, wherein the at least one tap comprises an end of contact of the at least one control object within a predetermined duration from initiating contact with the peripheral surface.

* * * * *